Aug. 25, 1925.

H. M. DOWSETT 1,550,682

ARC GENERATOR OF ELECTRIC OSCILLATIONS

Filed Sept. 23, 1922

Inventor
HARRY MELVILLE DOWSETT
By his Attorney

Patented Aug. 25, 1925.

1,550,682

UNITED STATES PATENT OFFICE.

HARRY MELVILLE DOWSETT, OF COLCHESTER, ENGLAND, ASSIGNOR TO RADIO CORPORATION OF AMERICA, A CORPORATION OF DELAWARE.

ARC GENERATOR OF ELECTRIC OSCILLATIONS.

Application filed September 23, 1922. Serial No. 589,974.

*To all whom it may concern:*

Be it known that I, HARRY MELVILLE DOWSETT, a subject of Great Britain, residing at Victoria Road, Colchester, Essex, England, have invented certain new and useful Improvements in Arc Generators of Electric Oscillations, of which the following is a specification, accompanied by drawings.

It has before been proposed when employing two arcs in parallel for the generation of electric oscillations to insert between the like electrodes of the two arcs two condensers and to connect the output circuit between the two condensers and to connect the output circuit between the two condensers of each pair. In such arrangements these inter-arc condensers have always been of smaller capacity than the condenser of the output circuits.

According to this invention I make each of the inter-arc condensers of a large capacity as compared with that of the condenser in the output circuit and I preferably also insert an inductance coil between each condenser in the output circuit and I preferably also insert an inductance coil between each condenser and the point of junction of the output circuit with the inter-arc connections, each branch of the arc circuit being electrically equivalent to the other. By so doing the inter-arc current can be considerably reduced and the proportion of the total energy which the output circuit can take up is increased.

My invention is illustrated in the accompanying drawing in which Fig. 1 is a diagram of the circuit connection according to my invention.

Fig. 2 shows an application of my invention to an open transmitting aerial and Fig. 3 is a modification of Fig. 2.

Referring to Fig. 1, I provide two arcs $A^1$ and $A^2$ the electrodes of which are joined together by condensers $C^1$ $C^1$, $C^2$ $C^2$ and inductance coils $L^1$ $L^1$, $L^2$ $L^2$, which together form the inter-arc circuit. The output or aerial circuit to which it is joined is represented by inductance coils L L, condenser C, resistance R.

Each of the condensers $C^1$ $C^1$, $C^2$ $C^2$, is of large capacity, say of the order of 1 mfd. The condenser C is of very much smaller capacity having a value such as is usual in any standard transmitting aerial. The inductance of the coils $L^1$ $L^1$ and $L^2$ $L^2$ are sufficiently large compared with the inductances of the coils L L to cause the current through the output circuit as indicated at I to be almost equal to the sum of the currents as indicated at $I^1$ and $I^2$, so that the component of the current in the inter-arc circuit which flows into the aerial may be as large as possible. The relative positions in each branch of the inter-arc circuit of the condensers and the inductance coils may be reversed if considered desirable without affecting the principle of working.

More than two arcs in parallel may be employed if desired.

Figure 1:
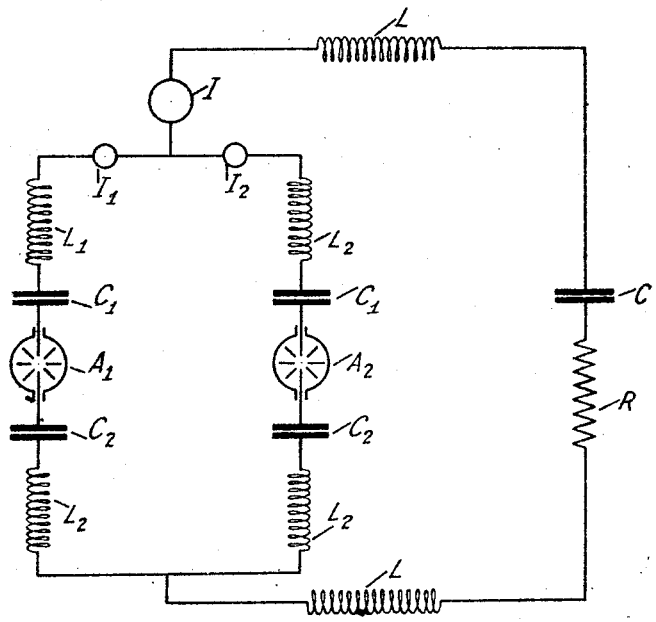
Figure 2:
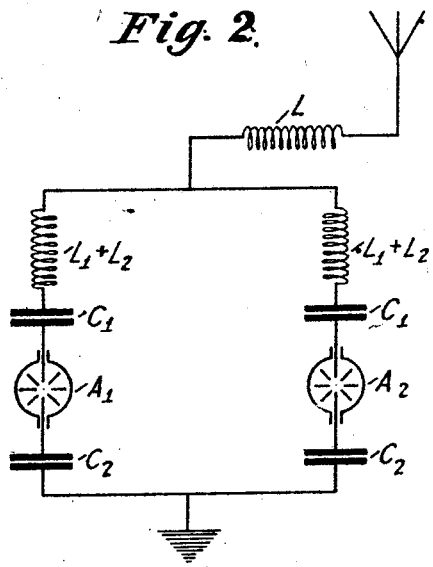
Figure 2 shows the application of the principle described to the case of an open transmitting aerial, the inductance coils $L^1$ and $L^2$ of Figure 1 in this case being inserted on the aerial side only of the arcs.
Figure 3:
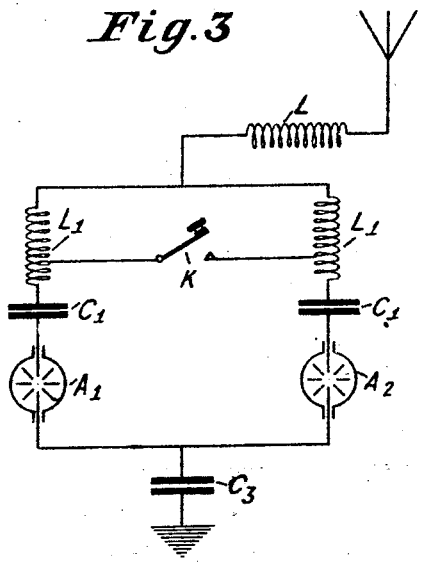
Figure 3 shows a modification in which the series condensers $C^1$ and $C^2$ of Figure 2 are replaced by a single condenser $C^1$ on the aerial side on each arc, while a blocking condenser $C^3$ is inserted in the connection to earth.

For the transmission of signals I join together certain points on the inductance coils, which are symmetrically placed electrically relatively to the point of junction of the output circuit with the inter-arc connections, by means of a signalling key K, Figure 3, which has the effect of increasing the inter-arc current and reducing the output current without altering the frequency of the output circuit.

Having now described my invention I declare that what I claim is:—

1. An arc generator of electrical oscillations comprising two arcs in parallel and condensers in the inter-arc circuit between the arcs and the output circuit, characterized in that each of the condensers in the inter-arc circuit is of large capacity as compared with the output circuit, substantially as described.

2. An arc generator according to claim 1 and having a signalling key connected to two symmetrical points in the inter-arc circuit.

3. In radio signalling apparatus, the combination of an antenna, a plurality of arc generators connected in parallel for feeding said antenna, and a condenser connected in series with each of said generators and the common output circuit, the capacity of said condensers being relatively large as compared with the capacity of said antenna.

4. In radio signalling system, the combination of an antenna, a plurality of arc generators connected in parallel for supplying said antenna, and a plurality of condensers of relatively large capacity as compared with the capacity of the antenna circuit connected in series between each of said arc generators and the junction point of said arc generator circuits.

5. In a radio signalling system, the combination of an antenna, a pair of arc generators connected in parallel for supplying current to said antenna, a condenser connected between each of said arc generators and the junction point of said separate generator circuits, and a signalling key connected between the circuits of said arc generators.

6. In a radio signalling system, the combination of an antenna, a pair of arc generators connected in parallel for supplying current to said antenna, a condenser connected between each of said arc generators and the junction point of said separate generator circuits, and a signalling key connected between two substantially symmetrical points in the arc generator circuits.

HARRY MELVILLE DOWSETT.